United States Patent Office 2,966,187
Patented Dec. 27, 1960

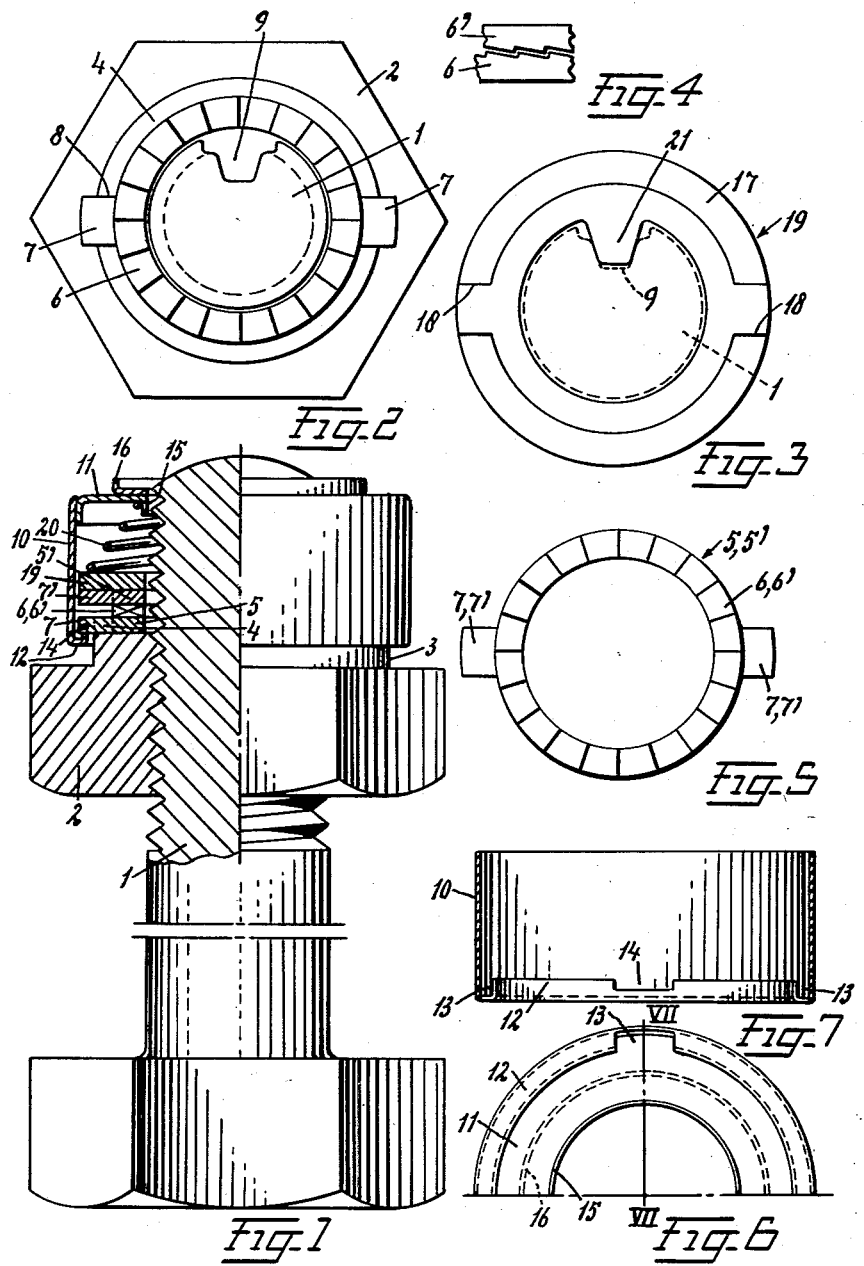

2,966,187

PAWL AND RATCHET BOLT AND NUT LOCK

Chris ter Cock, Driftlaan 17, Blaricum, Netherlands

Filed Oct. 14, 1958, Ser. No. 767,147

5 Claims. (Cl. 151—13)

The invention contemplates a nut locking device of the kind in which the nut is provided on one face with an annular arrangement of serrations or ratchet teeth and in which a locking member, likewise provided with serrations or ratchet teeth, is resiliently pressed against the nut; said locking member is provided with an inwardly projecting cam engaging in a longitudinally disposed groove on the associated bolt on which the nut is threaded so as to be longitudinally slideable but non-rotatable with respect to the bolt, such that when the nut is threaded on the bolt the two sets of ratchet teeth will readily slide over each other but will prevent retrograde movement of the nut.

It is an object of the invention to provide a nut locking device which is easy to handle and is effectively protected against damage of its vital parts and against fouling.

Another object of the invention is to provide a nut locking device comprising parts of relatively simple construction which are cheap in manufacture and durable in use.

This invention relates to nut locking devices.

According to the invention, the nut has at least two opposed radially projecting lugs secured thereto cooperating with bayonet-like slots formed in the side wall of the cap adapted to be secured on and released from the nut which cap accommodates a locking member and a spring pressing this member with its ratchet teeth into engagement with the ratchet teeth arranged on the nut.

According to a preferred embodiment of the invention the ratchet teeth associated with the nut are arranged on a ring member which also carries the two radially projecting lugs whereas the nut is on one side formed into a seat for this ring member in which the latter is pressed and firmly retained. This arrangement has the advantage that the serrations or ratchet teeth need not be cut in the body of the nut itself but that the ring member with the ratchet teeth and the lugs form a separate element which can be manufactured in any suitable way and from any suitable material independent of the nut.

According to a further advantageous embodiment of the invention the locking member likewise comprises a ring member having serrations or ratchet teeth formed on one side and having two radially outwardly projecting lug portions which ring member is fixedly mounted in an annular carrier member provided with an inwardly projecting cam adapted to engage the groove in the bolt. The ring member associated with the nut and the ring member associated with the locking member can thus be identical to each other which facilitates the manufacture of the locking device. The ring members can for instance be made by stamping and the serrations cold pressed therein.

Other features and advantages of the invention will appear more fully from the following description in conjunction with the drawings showing an embodiment of the nut locking device according to the invention.

Figure 1 is a side elevation, partly a longitudinal section of the lock nut threaded on a bolt;

Figure 2 is an end elevation of the arrangement of Figure 1 in which the cap has been removed from the nut;

Figure 3 is a plan view of the carrier member for one of the serrated rings;

Figure 4 illustrates the shape of the serrations of the two serrated rings;

Figure 5 is a plan view of the serrated rings;

Figure 6 is a bottom view of the cap; and

Figure 7 shows the cap in a section on the line VII—VII of Figure 6.

In the drawings, 1 is a bolt having a bolt head on one side and a nut 2 screwed on its threaded portion. The nut 2 has on its side facing away from the bolt head a cylindrical hub portion 3 of smaller diameter than the outer diameter of the nut body and presenting an axially projecting circumferential annular collar 4. The collar 4 forms a seat for a serrated locking ring 5 pressed and firmly retained therein which ring 5 is provided with a continuous annular row of ratchet teeth 6 projecting past the upper face of the collar 4. The ring 5 has two radially opposed flat lugs 7 of greater length than the thickness of the collar 4 and this collar has two slots 8 cut out therein which accommodate the lugs 7 with a tight fit. As appears from Figure 2, the lugs 7 thus extend some distance past the collar 4.

The bolt 1 is provided with a longitudinally disposed groove 9 of substantially trapezoidal sectional shape with rounded corners.

Arranged on the nut 2 is a retaining cap comprising a cylindrical sleeve 10 and a disc-shaped end wall 11 having a central opening through which the bolt 1 may pass. The cap 10, 11 is releasably mounted on the nut 2 by means of a bayonet-type joint. The one part of this bayonet joint is formed by the projecting ends of the lugs 7 on the locking ring 5 and the other part by suitable slots formed in the sleeve 10. To that effect, the sleeve 10 has on its side facing the nut 2 an edge portion 12 flanged inwardly through an angle of 180° which edge portion has been cutaway at two diametrically opposed spots to provide two entry slots 13 for the lugs 7; spaced at an angular distance of 90° from these entry slots 13 the flange 12 has two rectangular cut-out portions 14 forming seats for the ends of the two lugs 7. The inner diameter of the sleeve 10 is only slightly larger than the radial distance between the two end faces of the lugs 7.

The end wall 11 of the cap is pressed into the sleeve 10 and the upper edge of the sleeve is flared inwardly to firmly enclose the member 11. The central hole in the latter has an inwardly flanged rim 15. As shown in Figure 1, a disc 16 with up-turned outer edge may be welded onto the end wall 11 of the cap whereby an annular space is formed between this up-turned edge and the bolt 1 which may be filled with grease to prevent moisture from penetrating into the cap.

Inside the cap is arranged a locking member comprising a second serrated locking ring 5' mounted in a carrier ring 19. The locking ring 5' is identical to the locking ring 5 associated with the nut 2 and thus has a continuous annular row of ratchet teeth 6' on its side facing the nut and two radially projecting diametrically opposed lugs 7'. The carrier ring has an outer diameter which is equal to the distance between the end faces of the lugs 7' and fits within the sleeve 10 with little room for lateral play but is axially slideable and rotatable inside the sleeve. The carrier ring 19 has on its side facing the nut 2 a projecting annular rim portion 17 with two diametrically opposed slots 18 cut out therein. The locking ring 5' is pressed and firmly retained in the seat formed by this rim portion 17 with the lugs 7' lying in the slots 18 with a close fit. The ratchet teeth 6' project past the rim portion 17 and are identical to the ratchet teeth 6 of the locking ring 5 with which they cooperate (Fig. 4). The carrier ring 19 has a radially inwardly projecting cam 21 of trapezoidal shape corresponding to the sectional shape of the groove 9 in the bolt 1 and adapted to engage therein. As is shown in Figure 3 in dotted lines, the beveled flanks of the cam 21 engage the oblique side walls of the groove but the inner cam face lies free of the bottom wall of the groove.

The cap 10, 11 further accommodates a conical spring 20 which lies enclosed between the end wall 11 and the carrier ring 19. The smaller terminal coil of the spring 20 engages around the flange 15 of the end wall 11 and holds the spring in its central position, and the larger terminal coil on the side of the spring facing the nut lies flat against the face of the carrier ring 19. When the cap 10, 11 is mounted on the nut 2 the spring presses the ratchet teeth 6' of the locking ring 5' into engagement with the ratchet teeth 6 of the locking ring 5 on the nut. When the cap is released from the nut, the carrier ring 19 abuts with its rim portion 17 the flange 12 of the sleeve 10 and is thus retained inside the cap.

As follows from the foregoing, the locking ring 5 is locked against rotation with respect to the nut 2 by the lugs 7 engaging the slots 8 and the locking ring 5' is locked against rotation with respect to the carrier ring 19 by the lugs 7' accommodated in the grooves 18, whereas the carrier ring 19 is axially slideable but non-rotatable with respect to the bolt 1 because of its cam 21 engaging in the groove 9.

The nut locking device functions as follows. After the nut 2 has been threaded some distance onto the bolt 1, the cap 10, 11 is placed on the bolt with the cam 21 engaging in the groove 9. The cap is pushed against the nut and turned to such a position that the lugs 7 can enter into the slots 13 of the cap flange 12. The cap can now be pushed further on the nut against the action of the spring 20 and then be turned through an angle of 90° after which the lugs 7 will fall into the seats 14 of the cap flange. In this mounted position the cap is firmly held onto the nut by the action of the spring 20 which also presses the ratchet teeth 6 and 6' of the locking rings 5 and 5', respectively, into engagement. When the nut is now further tightened, the cap 10, 11 turns with the nut but the locking ring 5' associated with the carrier ring 19 cannot turn with respect to the bolt 1 so that the ratchet teeth 6 and 6' will slide over each other. Because of the shape of these teeth, as shown in Figure 4, a retrograde movement of the nut is not possible. Loosening of the nut is only possible by first removing the cap therefrom which can be easily done by first pushing it down onto the nut until the lugs 7 are disengaged from their seats 14 and then turning the cap with respect to the nut through an angle of 90° allowing the lugs 7 to pass through the slots 13. By the use of two cooperating serrated locking rings a very secure locking of the nut is obtained. By a proper choice of the pitch of the ratchet teeth it is possible to obtain that by a very small angular displacement of the nut on the bolt the two locking rings are already moved one step with respect to each other. The working pressure exerted by the nut on the work piece to be bolted can thus be accurately adjusted.

The nut can be easily manufactured as it need only be turned off on one side to provide the hub portion 3 and the collar 4 after which the two slots 18 must be cut out in this collar. These are relatively simple machining operations. The locking ring 6 and the nut can be made from different materials; for instance when using a nut of stainless steel which is difficult to be machined, a locking ring can be used of a type of steel which can be more easily worked, this ring lying protected inside the cap.

The carrier ring 19 also constitutes a work piece which can be made by a relatively simple machining operation.

The two lugs 7 of the locking 5 have a double function in that they prevent the locking ring from turning with respect to the nut on the one hand and form part of the bayonet joint on the other hand. If necessary the locking rings 5 and 5' may be secured to the nut 2 and the carrier ring 19, respectively, by spot welding.

By arranging the slots 13 and seats 14 of the bayonet joint in the flange portion 12 of the sleeve 10 the advantage is obtained, that the sleeve is strengthened by this flange portion instead of weakened by slots cut out therein while the unbroken sleeve wall provides a good protection for the various parts of the device arranged inside the cap. If desired, the cap can be completely filled with grease.

Although the invention has been shown and described with reference to a specific embodiment thereof it will be obvious to those skilled in the art that various modifications can be resorted to within the scope of the following claims.

What is claimed is:

1. A nut locking device, in combination with a bolt having a longitudinal groove, comprising a nut including a hub portion on one side thereof, said hub portion including an axially projecting cylindrical collar formed thereon, said collar being provided with at least two slots therein, a locking ring firmly seated in said collar and having two lug portions extending radially outwardly through the slots in said collar, said locking ring including ratchet teeth in a continuous annular row arranged on the outer side thereof, a retaining cap having bayonet-like slots therein adapted to cooperate with said lug portions to form a bayonet joint whereby said cap may be secured onto and released from said nut, an annular locking member inside said cap having ratchet teeth arranged in a continuous annular row facing said nut and adapted to cooperate with said ratchet teeth on said locking ring, said locking member including a radially inwardly projecting cam adapted to engage the groove in said bolt for longitudinal sliding movement therein, and a spring inside said cap urging said locking member against said locking ring with said cap mounted on said nut.

2. A nut locking device as claimed in claim 1, in which said cap includes a cylindrical side wall enclosing said lug portions with little room for lateral play and including at its end facing said nut a flange portion flared inwardly through an angle of substantially 180°, said flange portion having cutouts at two diametrically opposed positions so as to form the entrance portions of said bayonet slots for the introduction of said lugs and further having two diametrically opposed cutouts spaced from said entrance portions and forming seats for said lug portions.

3. A nut locking device as claimed in claim 1 in which said cap includes an end wall with a central opening for said bolt to pass through and including an outwardly projecting annular collar member encircling said opening and enclosing an annular space around the bolt passing through said opening adapted to be filled with grease.

4. A nut locking device as claimed in claim 1 in which said cap includes an end wall with a central opening and including an inwardly flared edge and in which said spring is a coil spring of conical shape and including a smaller terminal coil enclosing said edge portion.

5. A nut locking device, in combination with a bolt having a longitudinal groove, comprising a nut including an axially projecting cylindrical collar on one side, said collar having two diametrically opposed slots therein, a first locking ring seated in said collar and having two lug portions extending radially outwardly through the slots in said collar, said first locking ring including a continuous annular row of ratchet teeth on its side facing away from said nut, a retaining cap having bayonet-like slots formed adapted to cooperate with said lugs to constitute a bayonet joint for releasably securing said cap onto said nut, a second locking ring identical in shape to said first locking ring and including a continuous annular row of ratchet teeth and two diametrically opposed outwardly projecting lugs, a carrier ring for said second locking ring in which the latter is fixedly seated and provided with two diametrically opposed slots accommodating the lugs of said second locking ring, said carrier ring and second locking ring being positioned inside said cap with the ratchet teeth of said second locking ring facing the ratchet teeth of said first locking ring to cooperate therewith, and a spring element inside said cap urging said second locking ring against said first locking ring with the cap mounted on said nut.

References Cited in the file of this patent

UNITED STATES PATENTS

| | | |
|---|---|---|
| 1,027,508 | Schweinert et al. | May 28, 1912 |
| 1,651,187 | Cole | Nov. 29, 1927 |